(12) United States Patent
Liu

(10) Patent No.: US 6,965,167 B2
(45) Date of Patent: Nov. 15, 2005

(54) LAMINATED CHIP ELECTRONIC DEVICE AND METHOD OF MANUFACTURING THE SAME

(75) Inventor: Shih-Kwan Liu, Hsinchu (TW)

(73) Assignee: Inpaq Technology Co., Ltd., Miao Li Hsien (TW)

( * ) Notice: Subject to any disclaimer, the term of this patent is extended or adjusted under 35 U.S.C. 154(b) by 171 days.

(21) Appl. No.: 10/463,200

(22) Filed: Jun. 17, 2003

(65) Prior Publication Data

US 2004/0256735 A1 Dec. 23, 2004

(51) Int. Cl.⁷ .............................................. H01L 23/48
(52) U.S. Cl. ...................... 257/777; 257/762; 257/766; 257/528; 257/532; 257/778; 336/96
(58) Field of Search ............................. 336/96; 257/762, 257/766, 528, 532, 778

(56) References Cited

U.S. PATENT DOCUMENTS 4,490,706 A * 12/1984 Satou et al. .................. 336/96
4,525,921 A * 7/1985 Carson et al. ............... 438/109

\* cited by examiner

*Primary Examiner*—David Nelms
*Assistant Examiner*—Mai-Huong Tran
(74) *Attorney, Agent, or Firm*—Ladas & Parry LLP

(57) ABSTRACT

The present invention discloses a laminated chip electronic device and a method of manufacturing the same. In the laminated chip electronic device and the method of manufacturing the same according to the present invention, a body is made of a non-linear resistance coefficient material and has a plurality of conductive layers formed therein; an insulating layer is formed on the top, bottom, front and back surfaces of the body; and two electrodes are formed at the two ends of the body and electrically connected to the terminals of the conductive layers, respectively. Furthermore, in the present invention, two soldered interface layers are formed on the two electrodes, respectively.

8 Claims, 2 Drawing Sheets

LAMINATED CHIP ELECTRONIC DEVICE AND METHOD OF MANUFACTURING THE SAME

BACKGROUND OF THE INVENTION

1. Filed of the Invention

The present invention relates to a laminated chip electronic device and a method of manufacturing the same. More particularly, the present invention relates to a laminated chip electronic device with a non-linear resistance coefficient and a method of manufacturing the same, wherein an insulating layer is first formed on the top, bottom, front and back surfaces of a body of the laminated chip electronic device, so that subsequently formed electrodes are electroplated easily.

2. Description of the Related Art

Currently, laminated chip electronic devices (such as the one shown in FIG. 1) are widely used. Materials used for manufacturing the laminated chip electronic devices are various. Among these materials, non-linear resistance coefficient materials for manufacturing the bodies of the laminate chip electronic devices become more and more popular. The laminated chip electronic devices manufactured finally are to be used in electronic systems. For most laminated chip electronic devices, a soldering process is used to connect the two electrodes of each laminated chip electronic device to a circuit board of an electronic system, so that the laminated chip electronic device can normally operate in the electronic system. However, it still needs for the laminated chip electronic devices with their bodies made of a non-linear resistance coefficient material to have an easy-to-solder property. FIGS. 2A and 2B are schematic, cross-sectional views of a conventional laminated chip electronic device taken along a line A—A and a line B—B of FIG. 1, respectively. In FIGS. 2A and 2B, reference numerals 11, 12, 13 and 15 designate a body made of a non-linear resistance coefficient material, conductive layers, two electrodes and soldered interface layers, respectively.

However, the non-linear resistance coefficient material used to manufacture the body 11 of the conventional laminated chip electronic device of FIGS. 2A and 2B has a semiconductor property or does not have a high resistivity property. As a result, a process of forming the soldered interface layers 15 on the two electrodes 13, respectively, becomes very difficult.

To solve the above problem, there are three ways in the prior art as follows:

1. It is to adjust conditions of an electroplating process, and particularly to change the type and kind of an electroplating solution. When the body 11 of a laminated chip electronic device is electroplated, insulting parts of the device should not be adhered to by the soldered interface layers. In this way, an electroplating process can be used to form the soldered interface layers 15. However, particular production lines for the electroplating cannot be compatible with other products. This not only increases costs, but also needs different methods to treat particular electroplating wastewater, resulting in troubles to manufacture and increased costs. Moreover, an electroplating process can be performed for only parts of devices with a non-linear resistance coefficient material by setting specific conditions. For most devices with a non-linear resistance coefficient material, the soldered interface layers cannot be perfectly formed in an electroplating process, even though the conditions of the electroplating process are adjusted.

2. Referring to FIGS. 3A and 3B, after two electrodes 13 of a device are formed, two insulating layers 14 is formed on insulting parts of the device. As a result, when the soldered interface layers 15 are formed, they cannot be formed on the insulting layers 14. Since conventional laminated chip electronic devices are generally in a square shape, and the structure of the two electrodes 13 is first formed, the conventional laminated chip electronic devices are covered with the insulating layers 14 one by one, and each time only one surface of a conventional laminated chip electronic is covered with the insulating layer 14. As a result, this causes the manufacturing speed to slow down or yields to be reduced. For example, more equipment is needed to meet the requirements, causing high manufacturing costs.

3. Referring to FIGS. 4A and 4B, a conductive material used for two electrodes 13 contains special precious metal components (for example, platinum, palladium, etc.), so that the two electrodes can be used in a soldering process directly. However, the yields of the conventional laminated chip electronic devices are limited, and the prices of the devices are unstable, resulting from the limitations of the productions of the precious metals and the great variations of the prices of the precious metals. Moreover, the two electrodes are easy to oxidize, resulting in poor reliability. When used in a soldering process, the two electrodes can not have the same quality as those with soldered interface layers formed thereon.

SUMMARY OF THE PRESENT INVENTION

In view of the above, an object of the present invention is to provide a method of manufacturing a laminated chip electronic device. The method of the present invention comprises the steps of: forming a body made of a non-linear resistance coefficient material, having a plurality of conductive layers formed therein, and two ends, wherein each of the conductive layers has two terminals; forming an insulating layer on the top, bottom, front and back surfaces of the body; and forming two electrodes at the two ends of the body, the electrodes electrically connected to the terminals of each of the conductive layers, respectively.

Another object of the present invention is to provide a laminated chip electronic device. The laminated chip electronic device of the present invention comprises a body made of a non-linear resistance coefficient material, having a plurality of conductive layers formed therein, and two ends, wherein each of the conductive layers has two terminals; an insulating layer formed on the top, bottom, front and back surfaces of the body; and two electrodes formed at the two ends of the body, and electrically connected to the terminals of each of the conductive layers, respectively.

In the laminated chip electronic device and the method of manufacturing the same according to the present invention, the insulating layer is formed on the top, bottom, front and back surfaces of the body before the two electrodes are formed at the ends of the body. With such an arrangement, the subsequently-formed electrodes facilitate the performance of an electroplating process. The electroplating process performed for the electrodes of the present invention is suitable for use in any production lines without adjusting conditions of the electroplating process or a particular production line. Meanwhile, the step of forming the insulating layer can be performed for a batch of devices, and only small investment in equipment is required, so that a great throughput of the devices is obtained. In addition, the electrodes of the present invention can be made of materials with low prices.

Unlike the conventional laminated chip electronic device in which the insulating layer is formed on the insulating parts of the device after the electrodes are formed, the laminated chip electronic device and the method of manufacturing the same of the present invention do not have the drawback that devices are covered with the insulating layer one by one, and each time only one surface of the device is covered with the insulating layer, resulting in low manufacturing speed and poor yields.

Furthermore, in the laminated chip electronic device and the method of manufacturing the same according to the present invention, the electrodes can be used in a general electroplating process and do not need to be made of special precious metals. Therefore, the throughput of the devices according to the present invention is independent of the great variations of the prices of the precious metals.

DETAILED DESCRIPTION OF THE PREFERRED EMBODIMENTS

Figure 1:
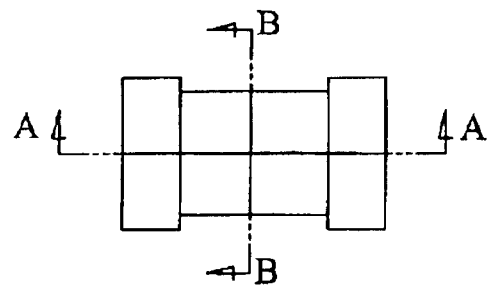
FIG. 1 shows a schematic, plane view of a laminated chip electronic device.
Figure 2A:
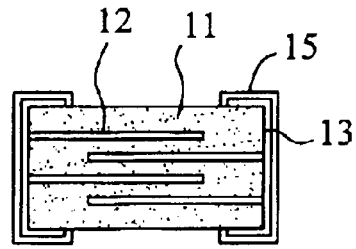
FIG. 2A shows a schematic, cross-sectional view of a conventional laminated chip electronic device taken along a line A—A of FIG. 1.
Figure 2B:
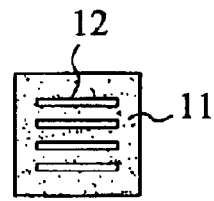
FIG. 2B shows a schematic, cross-sectional view of a conventional laminated chip electronic device taken along a line B—B of FIG. 1.
Figure 3A:
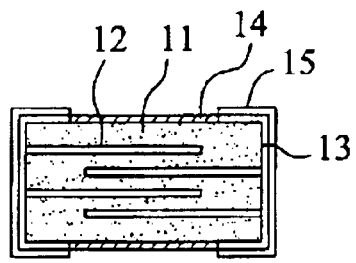
FIG. 3A shows a schematic, cross-sectional view of a conventional laminated chip electronic device taken along a line A—A of FIG. 1.
Figure 3B:
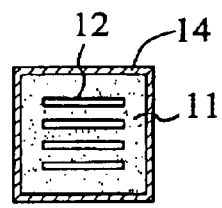
FIG. 3B shows a schematic, cross-sectional view of a conventional laminated chip electronic device taken along a line B—B of FIG. 1.
Figure 4A:
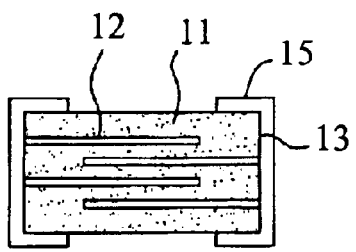
FIG. 4A shows a schematic, cross-sectional view of a conventional laminated chip electronic device taken along a line A—A of FIG. 1.
Figure 4B:
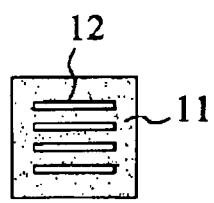
FIG. 4B shows a schematic, cross-sectional view of a conventional laminated chip electronic device taken along a line B—B of FIG. 1.
Figures 5A, 5B:
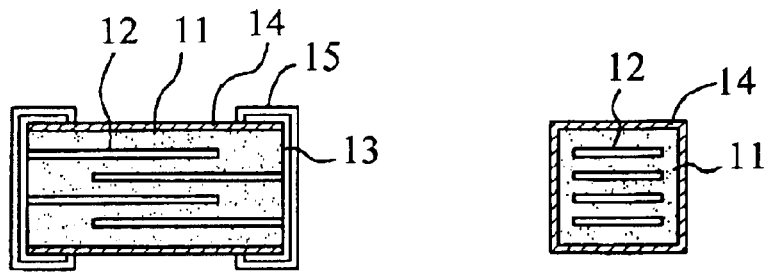
FIGS. 5A and 5B show schematic, cross-sectional views of a laminated chip electronic device of the present invention taken along a line A—A and a line B—B of FIG. 1, respectively.

FIGS. 5A and 5B shows schematic, cross-sectional views of a laminated chip electronic device of the present invention taken along a line A—A and a line B—B of FIG. 1, respectively. The laminated chip electrode device of the present invention comprises a body 11, made of a non-linear resistive material and having a plurality of conductive layers 12, an insulating layer 14, formed on the top, bottom, front and back surfaces of the body 11, and two electrodes 13, formed at the ends of the body 11. The two electrodes 13 are electrically connected to the terminals of the conductive layers 12. The non-linear resistance coefficient material can be a zinc oxide or a strontium titanic acid.

Figure 6:
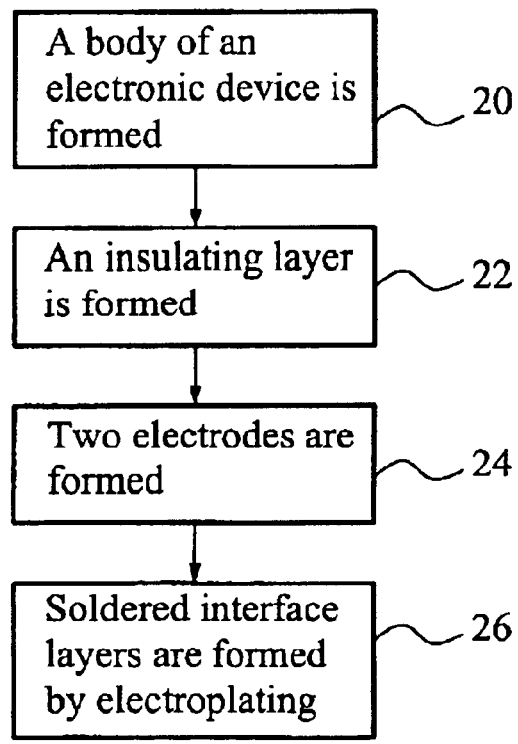
FIG. 6 shows a flow chart of manufacturing a laminated chip electronic device according to invention.

FIG. 6 shows a flow chart of manufacturing a laminated chip electronic device according to the present invention. Referring to FIG. 6, a method of manufacturing a laminated chip resistive device according to the present invention comprises the following steps: forming a body which is made of a non-linear resistance coefficient material and has a plurality of conductive layers formed therein (Step 20); forming an insulating layer on the top, bottom, front and back surfaces of the body (Step 22); forming two electrodes at the two ends of the body, wherein the electrodes are electrically connected to the terminals of each of the conductive layers, respectively (Step 24); and forming two soldered interface layers on the two electrodes, respectively (Step 26), by an electroplating process. The non-linear resistance coefficient material may be a zinc oxide or a strontium titanic acid.

The laminated chip resistive device and the method of manufacturing the same according to the present invention have the following advantages:

1. The step of forming the insulating layer according to the present invention can be performed for a batch of devices, and only small investment in equipment is required, so that a great throughput of the devices is obtained. In addition, the electrodes of the present invention can be made of materials with low prices.

2. With such an insulating structure, there is no need to use special electrode materials, and the limitation to the formation of the soldered interface layers is released.

3. The present invention relates to a laminated chip electronic device having a body which is made of a non-linear resistance coefficient material. The insulating structure not only releases the limitation to the formation of the soldered interface layers, but also provides a robust protective layer surrounding the body, that brings a positive benefit to the reliability of the device.

Given the above, the laminated chip electronic device having a body made of a non-linear resistance coefficient material and the method of manufacturing the same according to the present invention can release the limitation to the soldered interface layers. Meanwhile, the reliability of the device is enhanced. The laminated chip electronic device and the method of the present invention are different from the prior art, and were not disclosed before. Those knowledgeable in the art can make modifications within the scope and spirit of the invention which is determined by the claims below.

What is claimed is:

1. A method of manufacturing a laminated chip electronic device, the method comprising the steps of:

(a) forming a body of a non-linear resistance coefficient material with conductive layers therein, the body having two ends where the conductive layers have terminals;

(b) forming an insulating layer on all surfaces of the body expect the two ends; and (c) forming two electrodes respectively on the two ends of the body and electrically connected to the terminals.

2. The method as claimed in claim 1, further comprising the step of forming two soldered interface layers on the two electrodes, respectively.

3. The method as claimed in claim 1, wherein in step (a), the non-linear resistance coefficient material is a zinc oxide.

4. The method as claimed in claim 1, wherein in step (a), the non-linear resistance coefficient material is a strontium titanic acid.

5. A laminated chip electronic device, comprising:
 a body of a non-linear resistance coefficient material having conductive layers therein and two ends where the conductive layers have terminals;
 an insulating layer on all surfaces of the body except the two ends; an
 two electrodes respectively on the two ends of the body and electrically connect to the terminals.

6. The laminated chip electronic device as claimed in claim 5, further comprising two soldered interface layer formed on the two electrodes, respectively.

7. The laminated chip electronic device as claimed in claim 5, wherein the non-line resistance coefficient material is a zinc oxide.

8. The laminated chip electronic device as claimed in claim 5, wherein the non-line resistance coefficient material is a strontium titanic acid.

* * * * *